United States Patent
Chen et al.

(10) Patent No.: US 9,421,699 B2
(45) Date of Patent: Aug. 23, 2016

(54) FIXTURE FOR MOLD CORES

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Kun Chen, Shenzhen (CN); Zhi-Yong Tian, Shenzhen (CN); Bo-Wen He, Shenzhen (CN); Zhong-Xian Xu, Shenzhen (CN)

(73) Assignee: ScienBiziP Consulting (Shenzhen) Co., Ltd., Shenzhen (CN)

( * ) Notice: Subject to any disclaimer, the term of this patent is extended or adjusted under 35 U.S.C. 154(b) by 334 days.

(21) Appl. No.: 14/194,899

(22) Filed: Mar. 3, 2014

(65) Prior Publication Data

US 2014/0370140 A1    Dec. 18, 2014

(30) Foreign Application Priority Data

Jun. 17, 2013    (CN) .......................... 2013 1 02383418

(51) Int. Cl.
  *B29C 33/76*    (2006.01)
  *B29C 33/30*    (2006.01)
  *B29C 33/44*    (2006.01)

(52) U.S. Cl.
  CPC ................. *B29C 33/76* (2013.01); *B29C 33/30* (2013.01); *B29C 33/448* (2013.01)

(58) Field of Classification Search
  CPC ........ B29C 33/30; B29C 33/76; B29C 33/448
  USPC .......................................................... 249/176
  See application file for complete search history.

(56) References Cited

U.S. PATENT DOCUMENTS

| 4,020,516 | A  | * | 5/1977 | Gomez | ................... | B42B 5/106 |
|---|---|---|---|---|---|---|
|  |  |  |  |  |  | 140/92.3 |
| 7,008,212 | B2 | * | 3/2006 | Yang | ................... | B29C 45/2676 |
|  |  |  |  |  |  | 249/120 |

* cited by examiner

*Primary Examiner* — Robert B Davis
(74) *Attorney, Agent, or Firm* — ScienBiziP, P.C.

(57) ABSTRACT

A fixture for a plurality of mold cores includes a platform, a side plate mounted to the platform, a plurality of positioning tabs, and a pushing member. The plurality of positioning tabs is located on the platform and abuts the side plate. The plurality of positioning tabs is spaced to each other. The pushing member is configured to retain the plurality of mold cores to the side plate.

19 Claims, 6 Drawing Sheets

FIXTURE FOR MOLD CORES

FIELD

The disclosure generally relates to a fixture to fix a plurality of molding cores.

BACKGROUND

A mold core is a device used in casting or molding processes to produce internal cavities and reentrant angles. The mold core is typically a disposable item and is destroyed to remove the mold. Different molds have different specifications, and the mold core must be manufactured to be applied with a mold before use. One manufacturing process is to cut or grind the mold core. However, the mold core is traditionally manufactured one at a time on a clamp. Therefore, it is time-consuming to make different mold cores for the molds.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
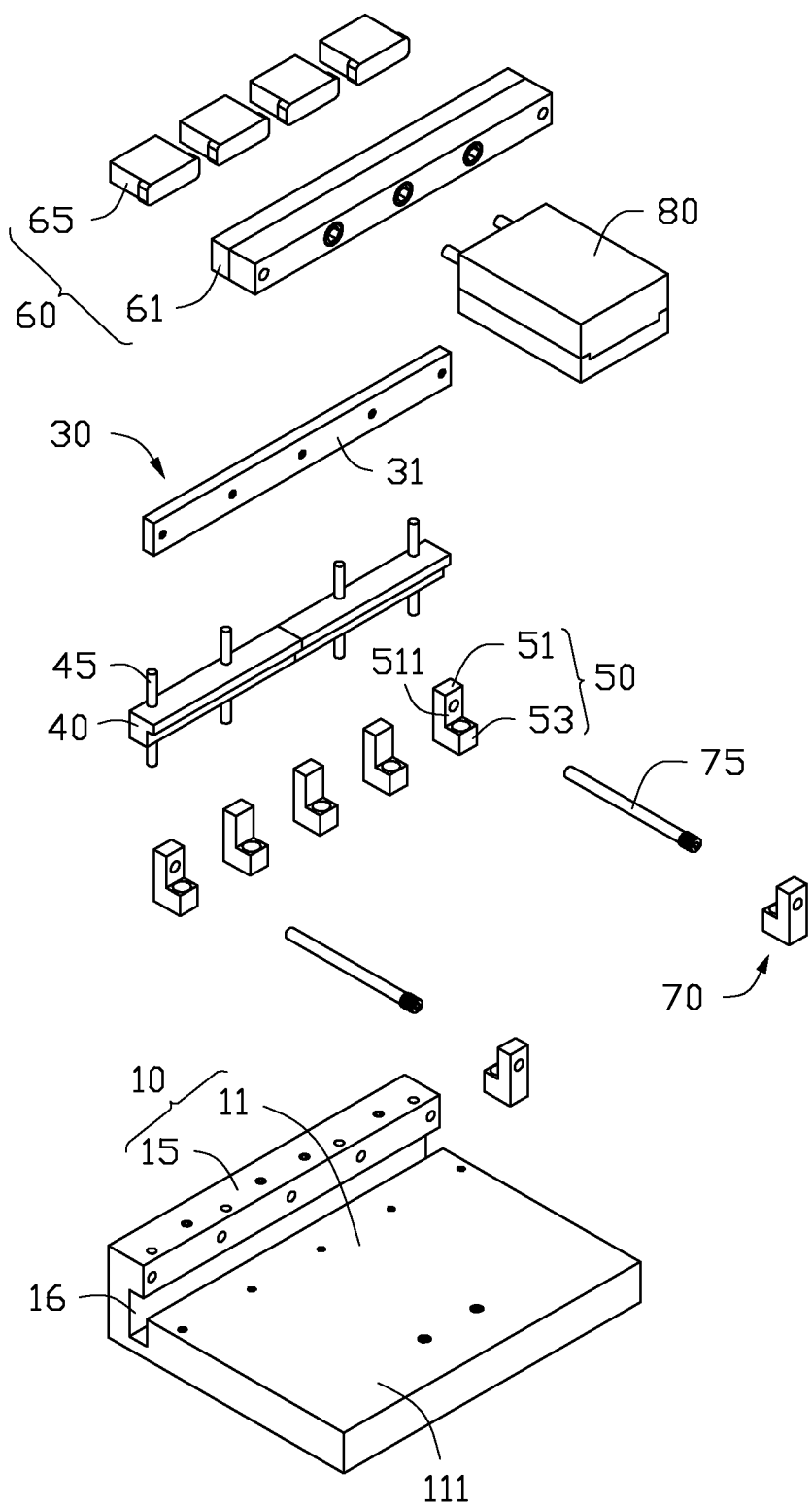
FIG. 1 is an exploded, isometric view of one embodiment of a fixture.
Figure 3:
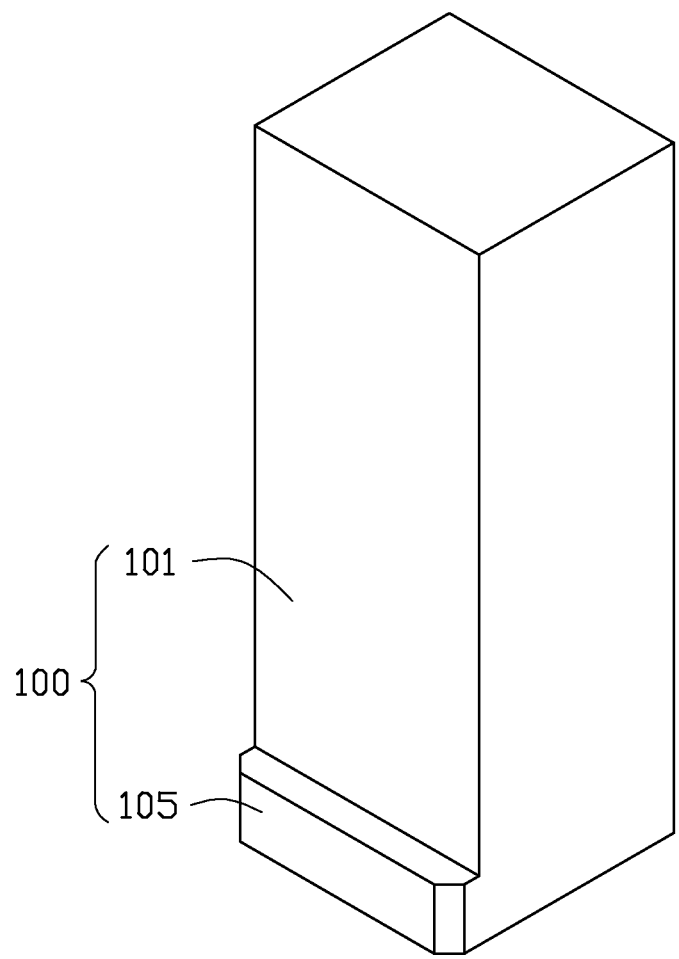
FIG. 3 is an isometric view of a mold core in one embodiment.

FIG. 1 illustrates one embodiment of a fixture for fixing a plurality of mold cores 100 (shown in FIG. 3). The fixture includes a platform 10, a side plate 31, a plurality of positioning tabs 50, a latch 40, a pushing member 60, two guiding tabs 70, two guiding poles 75, and a cylinder 80.

The platform 10 includes a main body 11 and a back board 15. The back board 15 is located on one side of the main body 11. The main body 11 defines a supporting plane 111. A cross section of the back board 15 is substantially L-shaped. A groove 16 is defined between the back board 15 and the main body 11.

The latch 40 is elongated. A cross section of the back board 15 is substantially L-shaped. The latch 40 includes a plurality of pins 45 to engage with the platform 10.

The side plate 30 is elongated. The side plate 30 defines an orientating plane 31.

Each positioning tab 50 includes a locater 53 and a positioning portion 511. The positioning portion 511 defines two side surfaces. The two side surfaces 511 are substantially parallel to each other.

The pushing member 60 includes a base 61 and a plurality of engaging tabs 65. The plurality of engaging tabs 65 can be resiliently moved relative to the base 61. The plurality of engaging tabs 65 is evenly spaced.

Figure 2:
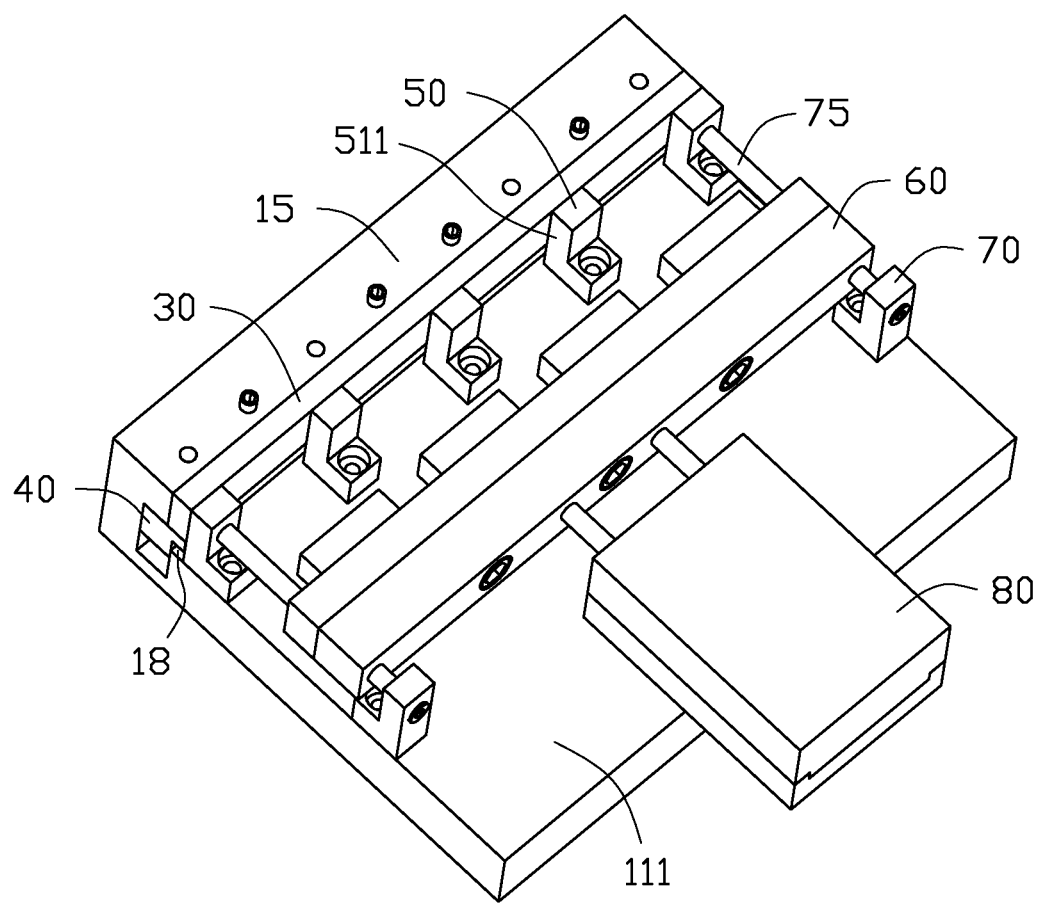
FIG. 2 is an assembled view of the fixture of FIG. 1.

FIG. 2 illustrates an assembled view of the fixture of FIG. 1. In assembly, the latch 40 is mounted in the groove 16 of the platform 10. The plurality of pins is engaged with the platform 10 to allow the latch 40 to move along a vertical direction substantially perpendicular to the supporting plane 111. The side plate 30 is mounted to the back board 15. A retaining space 18 is defined between the side plate 30 and the supporting plane 111. The latch 40 protrudes into the retaining space 18. The plurality of positioning tabs 50 is located on the supporting plane 111 and abuts the orientating surface 31 of the side plate 30. The plurality of positioning tabs 51 is evenly spaced. In one embodiment, a distance between two adjacent positioning tabs 50 is about 40 mm. The two guiding tabs 70 are located on the supporting plane 111. The two guiding poles 75 are mounted between the two guiding tabs 70 and two lateral positioning tabs 50 and extend through the pushing member 60. The pushing member 60 can be moved along the two guiding poles 75. The cylinder 80 is mounted to the platform 111 and is connected to the pushing member 60.

FIG. 3 illustrates one embodiment of a mold core 100. The mold core 100 includes a core body 101 and a protrusion 105. The protrusion 105 protrudes from the core body 101.

Figure 4:
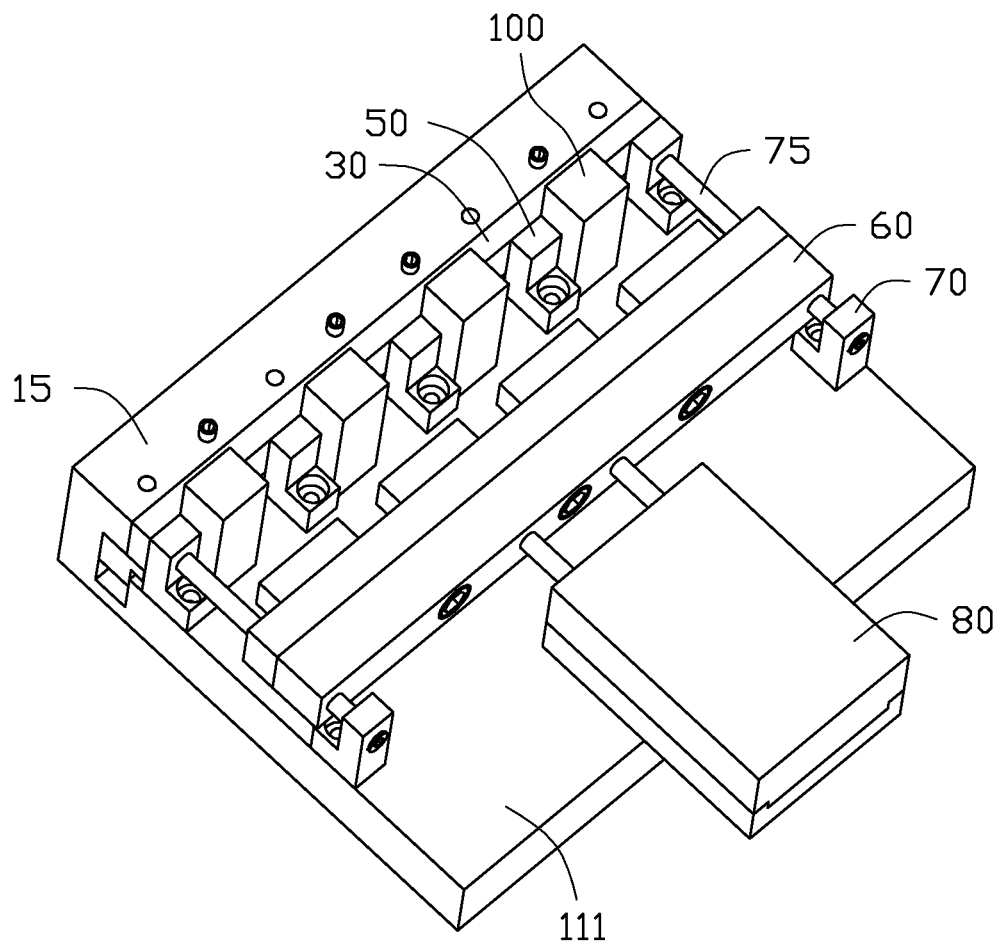
FIG. 4 is an isometric view of a state of the fixture for retaining a plurality of mold cores in one embodiment.
Figure 5:
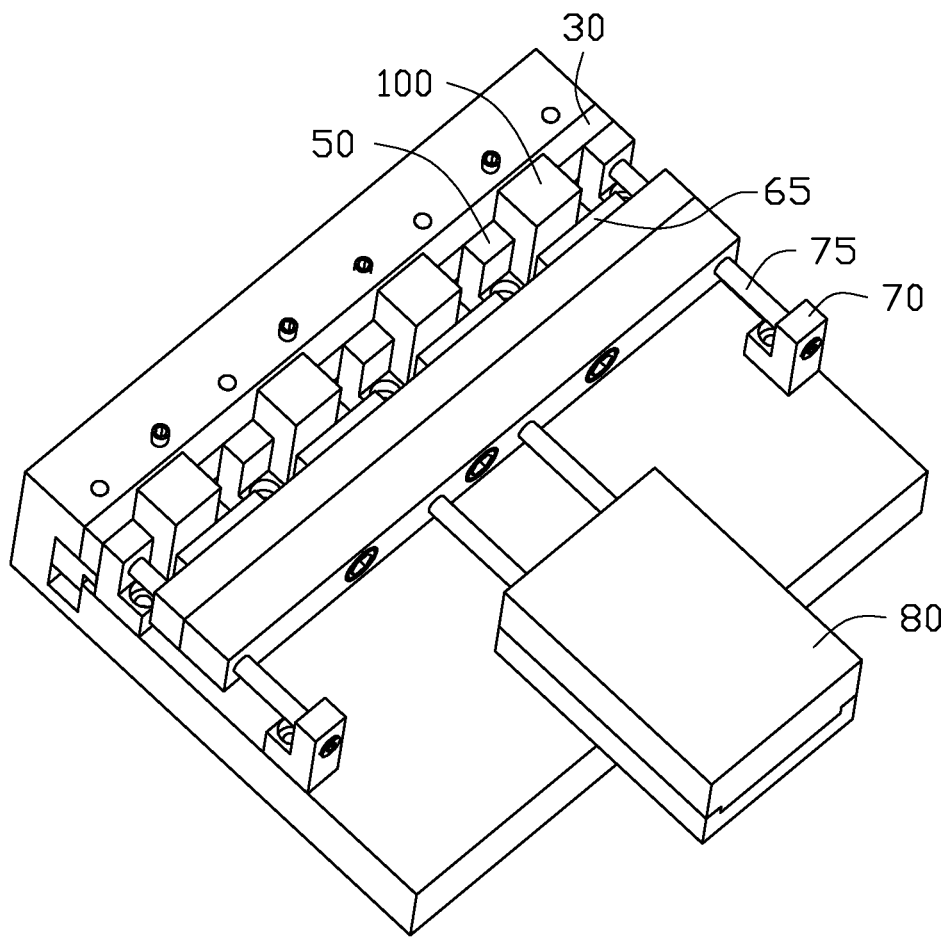
FIG. 5 is similar to FIG. 4, but shows the plurality of mold cores being fixed.
Figure 6:
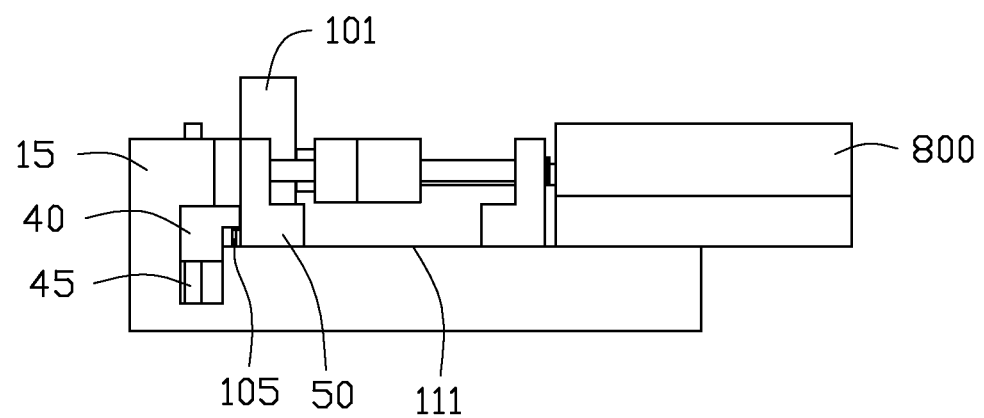
FIG. 6 is a lateral view of the fixture and the plurality of mold cores of FIG. 5.

FIG. 4 to FIG. 6 illustrate fixing states of the fixture. When fixing the plurality of mold core 100, each mold core 100 is located between two adjacent positioning tabs 50. The protrusion 105 of each mold core 100 extends into the retaining space 18. Each core body 101 abuts the orientating plane 31 of the side plate 30. The latch 40 moves down to press down each protrusion 105 to the supporting plane 111. The cylinder 80 pushes the pushing member 60 to move toward the plurality of mold cores 100. The plurality of engaging tabs 65 resiliently abuts the plurality of mold cores 100 to retain the plurality of mold cores 100 to the side plate 30. The plurality of mold cores 50 is fixed.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A fixture for a plurality of mold cores, comprising:
a platform;
a side plate mounted to the platform;
a plurality of positioning tabs located on the platform, abutting the side plate, and spaced from each other; and
a pushing member;
wherein the pushing member is configured to retain the plurality of mold cores to the side plate.

2. The fixture of claim 1, wherein the side plate defines an orientating plane, and the plurality of positioning tabs abuts the orientating plane.

3. The fixture of claim 2, wherein each of the plurality of positioning tabs defines two substantially parallel side surfaces, and the two side surfaces are substantially perpendicular to the orientating plate.

4. The fixture of claim 3, wherein the plurality of positioning tabs are evenly spaced.

5. The fixture of claim 4, wherein a distance between two adjacent positioning tabs of the plurality of positioning tabs is about 40 mm.

6. The fixture of claim 1, wherein the platform defines a supporting plane, the plurality of positioning tabs is located on the supporting plane, and a retaining space is defined between the side plate and the supporting plane to retain the plurality of mold cores.

7. The fixture of claim 6, further comprising a latch located in the retaining space, wherein the latch is configured to press the plurality of mold cores to the supporting plane.

8. The fixture of claim 7, wherein a cross section of the latch is substantially L-shaped.

9. The fixture of claim 1, further comprising two guiding poles and two guiding tabs, wherein the two guiding poles are connected to the pushing member and are slidably mounted to the two guiding tabs, and the two guiding tabs are mounted to the platform.

10. The fixture of claim 1, wherein the pushing member comprises a plurality of engaging tabs, and the plurality of engaging tabs is configured to resiliently abut the plurality of mold cores.

11. A fixture for a plurality of mold cores, comprising:
a platform comprising a main body and a back board, the main body defining a supporting plane for locating the plurality of mold cores;
a side plate mounted to the back board, a retaining space being defined between the side plate and the supporting plane to retain the plurality of mold cores along a first direction; and
a pushing member;
wherein the pushing member is configured to retain the plurality of mold cores to the side plate along a second direction, and the first direction is substantially perpendicular to the second direction.

12. The fixture of claim 11, further comprising a plurality of positioning tabs, wherein the plurality of positioning tabs is located on the platform and abut the side plate, and the plurality of positioning tabs is spaced to each other to space the plurality of mold cores; the side plate defines an orientating plane, and the plurality of positioning tabs abuts the orientating plane.

13. The fixture of claim 12, wherein each of the plurality of positioning tabs defines two substantially paralleled side surfaces, and the two side surfaces are substantially perpendicular to the orientating plate.

14. The fixture of claim 13, wherein the plurality of positioning tabs are evenly spaced.

15. The fixture of claim 14, wherein a distance between two adjacent positioning tabs of the plurality of positioning tabs is about 40 mm.

16. The fixture of claim 11, further comprising a latch located in the retaining space, wherein the latch is configured to press the plurality of mold cores to the supporting plane.

17. The fixture of claim 16, wherein a cross section of the latch is substantially L-shaped.

18. The fixture of claim 11, further comprising two guiding poles and two guiding tabs, wherein the two guiding poles are connected to the pushing member and are slidably mounted to the two guiding tabs, and the two guiding tabs are mounted to the platform.

19. The fixture of claim 11, wherein the pushing member comprises a plurality of engaging tabs, and the plurality of engaging tabs is configured to resiliently abut the plurality of mold cores.

* * * * *